Sept. 14, 1965   L. S. BURCHELL   3,206,604
ADJUSTABLE X-RAY FIELD DEFINING CONE
AND FIELD SIZE INDICATING MEANS
Filed Nov. 13, 1962   3 Sheets-Sheet 1

INVENTOR.
LLOYD S. BURCHELL
BY *Ralph H. Hohenfeldt*
ATTORNEY

L. S. BURCHELL 3,206,604

ADJUSTABLE X-RAY FIELD DEFINING CONE
AND FIELD SIZE INDICATING MEANS

Filed Nov. 13, 1962

INVENTOR.
LLOYD S. BURCHELL

BY *Ralph G. Hohenfeldt*

ATTORNEY

United States Patent Office 3,206,604
Patented Sept. 14, 1965

3,206,604
ADJUSTABLE X-RAY FIELD DEFINING CONE AND FIELD SIZE INDICATING MEANS
Lloyd S. Burchell, West Allis, Wis., assignor to General Electric Company, a corporation of New York
Filed Nov. 13, 1962, Ser. No. 237,089
5 Claims. (Cl. 250—105)

This invention relates to a device for defining the field of radiation that is projected from an X-ray tube onto an X-ray image recording or visualizing means. Such devices are variously known as X-ray cone, shutter and collimator assemblies.

X-ray cone assemblies usually include a housing with an X-ray beam entrance opening at one end and an exit opening at the other end. The end with the entrance opening is coupled to the casing of an X-ray tube so that a conical beam of radiation, whose apex is at the focal spot of the tube may diverge through the casing and fall on a distantly situated sensitive element such as an X-ray film cassette, fluoroscopic screen or image intensifier. The cross sectional dimensions of the radiation beam are preferably limited so that only that portion of the human anatomy is irradiated which is to be examined and which can be encompassed by the image sensitive means.

In the present invention, as well as in some known devices, the beam cross sectional dimensions are defined by pairs of swinging shutter blades that are at right angles to each other. The blades in a pair are movable toward and away from each other by some adjusting means that are controlled from the outside of the housing. Since the size of the projected field depends on the distance from the focal spot to the sensitive element, means are usually provided for correlating the shutter blade openings with the distance. Heretofore this has been done by reading a scale which indicates the shutter blade openings and then referring to a chart which gives the field size that corresponds with the focal spot-to-sensitive element distance. Other cone assemblies have been provided with shutter opening indicia displaying scales, the proper one of which is selected by reading in relation to another adjacent indicia of the focal spot-to-sensitive element distance which appears on the housing. One can readily see that either of these methods for coordinating field size with focal spot distance has a great probability for human error through mis-reading, in which case the field may be too small, or much worse, it may be unnecessarily large so as to give an unneeded radiation dose to the patient.

Most prior X-ray cone assemblies have required close machining tolerances and very careful assembly in order to assure that the center of the radiation field will be located when the blade pairs are nearly closed and that they will maintain their relationship with respect to center when they are opened. Recognition of this problem has led to extremely complicated designs and solutions which have been largely self-defeating because the more complicated they are, the more likely it is that there will be free-play and backlash between the shutter blades and their operating mechanism. One of the disadvantages of prior cone assemblies has been that they have offered no convenient way for independently centering each blade in a pair during assembly nor has there been a good way of preserving the relationship between the blades without backlash and free play.

The purpose of the present invention is to overcome the above noted problems and to provide roentgenologists with a cone assembly that is easy to operate, safe, inexpensive and which enables consistent determination of field dimensions and field sharpness.

Accordingly, it is an object of this invention to provide an X-ray cone assembly that displays only the field dimensions that pertain to the particular focal spot-to-sensitive element distance for which the X-ray tube is positioned. That is, through a single sight opening, a drum is visible on which is marked and displayed the X-ray field dimensions and each dimension is indicated by alternate pointers that are positioned in accordance with the shutter blade settings, and on the same scale, only one related focal spot-to-film distance appears.

Another object is to couple the shutter blades for joint movement by means of an endless cable that facilitates independent centering of the blades, eliminates backlash and free play between them and preserves their angular relationship throughout the life of the cone.

A further object is to provide the cone assembly with a shutter adjustment indicating device that will not lose its calibration in ordinary use or even if the blades are over-driven in either direction.

A significant object of this invention is the provision of a basic X-ray cone structure which in one form is adapted for manual operation and, in another form, is adapted for remotely controlled motor driven operation. The motor driven embodiment is provided with remote shutter blade opening indicators of an electric type.

Achievement of the foregoing and other more specific objects will appear from time to time throughout the course of the ensuing specification.

Preferred embodiments of the manual and motor driven versions of the new cone assembly will now be described in conjunction with the drawings in which.

Figure 1:
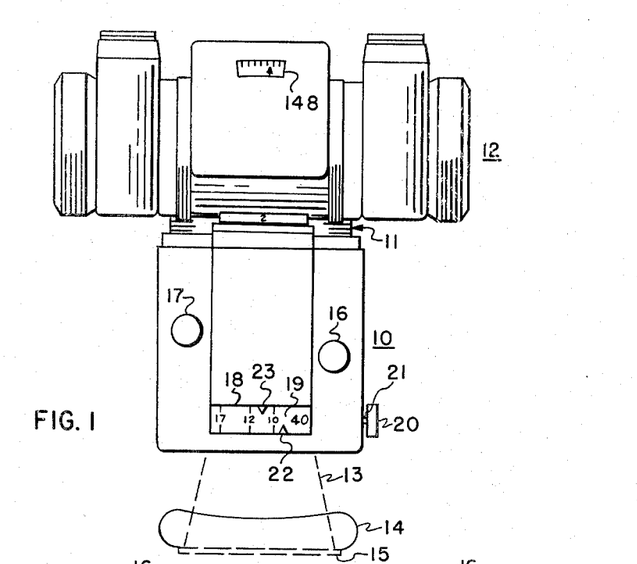
FIG. 1 is a front elevation view of an X-ray tube casing with the new cone assembly attached.

The invention is introduced in FIG. 1 where the new cone 10 and a filter assembly 11 are shown joined with an X-ray tube casing 12. It is understood that within the casing is an X-ray tube whose focal spot is the apex of a cone of radiation emerging from the bottom of cone assembly 10 as indicated by the dashed lines 13. The emerging and diverging beam penetrates a patient 14 to create a shadow image of the intervening anatomy of interest on a sensitive device 15 which may be a radiographic film cassette, fluoroscope or electronic image amplifier. For brevity, the term cassette will be used hereafter to indicate any of the sensitive devices just mentioned. The object of using the cone assembly is, of course, to sharpen the X-ray beam and to limit its divergence so it does not exceed the dimensions of cassette 15 and thereby irradiate regions of the patient that could not be viewed or recorded anyway.

The cone assembly 10 in FIG. 1 has the external appearance of the manually operated version of the invention. In order to converge or diverge the limiting rays 13 of the X-ray field in planes parallel with and normal to the plane of the drawing, there are provided a pair of manual control knobs 16 and 17 which may be turned in opposite directions. It will be explained later that turning of knobs 16 and 17 results in controlling the opening between pairs of shutter blades in the cone assembly so as to define the desired field dimensions on cassette 15.

On the front of housing 10, there is provided a sight opening 18 behind which there is located a drum 19 that has a scale on it of field dimensional markings such as the numbers 10, 12 and 17. In this illustration, there also appears on the drum a number 40 which is an indication in inches of the focal spot-to-cassette or film distance that relates to the field dimensions just given. The drum 19 is rotatable by a knob 20 which is on the same shaft 21 as is the drum. When the knob 20 is rotated, different quadrants of drum 19 appear in the sight opening 18. Each quadrant has a different focal spot-to-film indicia in place of the numeral 40 in the illustration. For instance, other focal spot-to-film distances may be 36, 48 or 72 inches. When these latter numbers are in view the dimensional indicia scale is shifted axially along the drum. The dimensional indicia used on the drum range from 5″ to 17″ in order to correspond with the customary cassette sizes which range from 5″ x 7″ to 14″ x 17″. The field dimensions, cassette sizes and focal spot distances may, of course, be expressed also in terms of the metric system of measurement.

Rotation of knobs 16 and 17 causes respectively associated pointers 22 and 23 to traverse axially along the drum into correspondence with field dimensions appearing thereon. Thus, rotation of knob 17 causes pointer 23 to move until the operator places it in registry with the field dimension indicia appearing on the drum. Next to the dimension scale is the corresponding focal spot-to-film distance chosen, which is 40 inches in this instance. Rotating knob 17 in one direction will cause field defining rays 13 to converge in the plane of the paper and thereby narrow the field. Rotation in the opposite direction will, of course, cause divergence of the beam. Rotation of knob 16 controls pointer 22 and the field dimensions in a plane normal to the drawing.

The motor driven version substitutes externally acessible switches in place of knobs 16 and 17 in which case operation of the switches moves pointers 22 and 23. The motor driven version is often used in cases where the focal spot-to-film distance is fixed so that a single fixed scale may be substituted for rotatable drum 19. It will be shown later that where the new cone assembly is adapted for being driven by motors, that the control switches and shutter blade indicating means may be at a remote station that is a safe distance from the X-ray source.

Attention is now invited to FIGS. 2 and 3 in conjunction with which the manually operated version of the new cone assembly will be described. The sheet metal shell forming the cone assembly housing 10 is shown as a dash-dot line in the figures and the filter assembly 11 is omitted.

Figure 3:
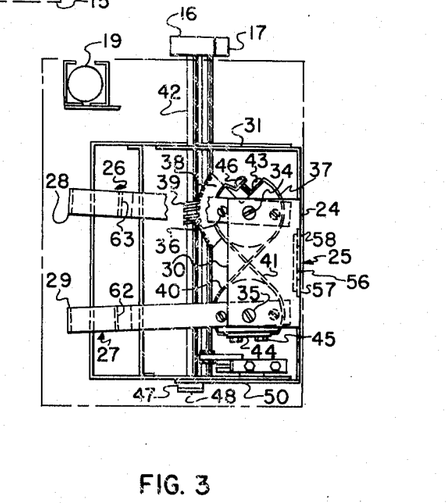
FIG. 3 is a side view of the mechanism in FIG. 2, with parts removed, but showing one of the two pairs of pivoted shutter blades where each blade carries a pulley that is connected to the other by a cross-over cable. Also shown is a helical gear and mating sector for driving one pulley which operates the other by means of the cable connection.

In FIG. 3 the top of the cone assembly is identified by the reference numeral 24. This top surface is fastened adjacent the bottom of filter assembly 11 in FIG. 1 so that the central beam indicated as an arrow with the reference numeral 25 passes down through the cone assembly and emerges between a pair of shutter blades 26 and 27. The field defining rays are established by the lower edges of the blades as indicated at 28 and 29. Although the blades may be steel, edges 28 and 29 are preferably covered with lead in order to minimize X-ray transmission and thereby sharpen the field definition.

The cone assembly includes a chassis or frame on which the operating mechanism is supported. In FIG. 3 it may be seen that the chassis constitutes a single piece of metal whose opposite sides are bent away from top 24. Thus, there are a pair of similar sides 30 and another pair 31 that form the chassis. The top 24 of the chassis may be attached to the bottom of filter assembly 11 by any suitable means such as screws which are not shown.

Figure 2:
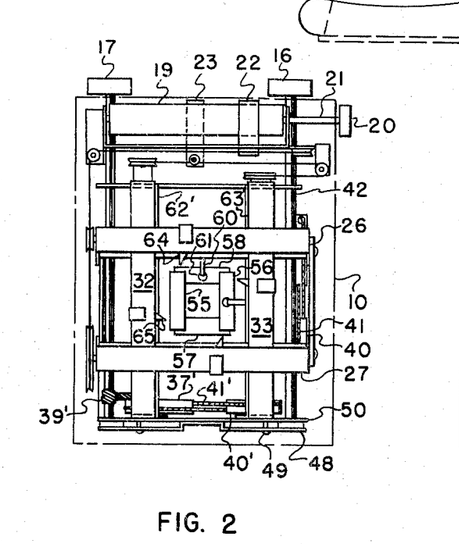
FIG. 2 is a bottom view, with the housing removed, of a manually operated cone assembly.

For the sake of clarity only one pair of shutter blades 26 and 27 are shown in FIG. 3, the other pair 32 and 33 which may be seen in FIG. 2 being omitted. In FIG. 3, blade 26 is carried on fixed shaft 34 inside member 30. Blade 27 is similarly pivoted about an axis normal to the paper at 35. In reality, the blades are U-shaped and closed at their bottoms 28 and 29 so that there are pivots corresponding with 34 and 35 on the opposite side member 30 which is congruent with the one that appears in FIG. 3.

Affixed to the blade 26 by means of screws 36 and to the same shaft 34 about whose axis blade 26 rotates, is a pulley 37. Fastened to pulley 37 for rotation with it and blade 26 is a gear sector 38. The gear sector mates with a helical gear 39 on shaft 42 which is rotatable by manual control knob 16 when it is desired to change the opening between blades 26 and 27. Mating blade 27 also has fastened to it a pulley 40 which rotates with this blade around shaft axis 35. Pulleys 37 and 40 on the respective blades are connected for joint rotation by a cross-over wire cable 41. Thus, when knob 16 is rotated, blades 26 may be jointly rotated toward or away from each other in order to change the X-ray field size on the cassette 15.

Use of the cross-over cable 41 to connect the driving blade 26 to the driven blade 27 has several important advantages. Among them are that the blades may be easily centered with respect to the radiation field during assembly and the machining tolerance requirements are greatly reduced. The blade centering adjustment during assembly is accomplished with a jig, not shown. The jig has a blade which extends through the top and exits at the bottom of the cone assembly coincident with the central ray 25, in which position the blade is clamped. The blade extends through the cone assembly between edges 28 and 29 at the bottom of the blades. With cross-over cable 41 loose, knob 16 is turned until blade 26 is brought to its center position through the coaction of helical gear 39 and segment 38. Cross-over cable 41 may then have one of its ends secured on pulley 37 by a screw and eye assembly 43. The cable 41 runs around to the opposite side of the other pulley 40 and across its flat back underneath a cable clamping plate 44 that is attached to pulley 40 by a pair of screws 45.

From underneath clamping plate 44, cable 41 runs back to the opposite side of other pulley 37 where it terminates in an eye and tightening screw assembly 46. Thus, the cable is formed in a closed, taut loop. It will be observed that screw 46 has an exposed thread portion leaving some space between its head and a V-shaped notch in pulley 37. Turning screw 46 clockwise, of course, places more tension on both sides of cable 41 if pressure plate 44 is not pressed against pulley 40. Thus, with cross-over cable 41 stressed to reasonable tautness, it is still possible to swing blade 27 until its tip 29 abuts against tip 28 on the opposite blade with jig blade intervening. At this time, both blade tips 28 and 29 are near and equidistant to the central ray 25. Screws 45 are then tightened so as to cause clamping plate 44 to clamp cable 41 on the back side of pulley 40. This places pulleys 37 and 40 and accordingly, blades 26, 27, in a fixed angular relationship with respect to each other.

It may be observed that shaft 42, on which helical gear 39 is fixedly mounted, terminates in a disc 47 which acts as a friction member to place torsional drag on the shaft when it is turned. Because of the high mechanical advantage between helical gear 39 and segment 38, the blades 26 and 27 rotate so easily that it is necessary to increase the friction of the system in order to give the operator the proper feel when he turns knob 16. It may be seen that the disc 47 is adapted for being pressed endwise by a resilient metal strap 48 that acts like a leaf spring. By turning a screw 49 which is threaded through the spring 48 and which bears on side 50 of the cone assembly frame, more or less frictional drag may be created.

The other pair of blades 32 and 33 which appear in FIG. 2 are also provided with the helical gear and sector drive and a crossover cable like that just discussed with respect to shutter blades 26 and 27. Parts associated with the operating mechanism for the blade pairs are given primed reference numerals where they apply to blades 32 and 33 as compared with the unprimed numerals used in connection with the driving elements for blades 26 and 27. Both blade pairs are driven in essentially the same way.

Cooperating with pairs of blades 26, 27 and 32, 33 to define a cone of radiation emanating from the focal spot of the X-ray tube is a pair of sliding shutter blades 55, 56 and 57, 58. These blades are known in the art so they are just schematized in FIG. 2, but it will be appreciated that they are located within the chassis of the cone near the top where ray 25 enters, see FIG. 3. Sliding blades in the pair 57 and 58 are coupled for coaction with each other and they are further coupled for being driven from one of the lower shutter blades 26 or 27. The connection between blade 26 and 58 is symbolized by a link 60. Link 60 may make a ball and socket connection at 61 with one of the sliding blades 58. Intervening between link 60 and the point where it makes connection with blade 26 may also be another ball and socket and further linkage which enables a universal or self-aligning connection between the swinging and sliding blades. The opposite pair of sliding blades 55 and 56 may likewise be coupled with the other pair of swinging blades 32 and 33 by ball and socket linkage. It will be understood that while the presence of sliding blades 57, 58 and 55 and 56 are necessary for operability of the cone assembly, their particular construction and the mechanism through which they are driven may take any form that suits the convenience of a mechanical designer. It is only essential that opposite pairs of sliding blades such as 57 and 58 preserve their equal distance from central ray 25 in synchronism with the gap between the swinging blades 26 and 27 when knob 16 is turned. Thus, the upper sliding blades cooperate with corresponding pairs of lower swinging blades in such a manner as to define a cone of radiation that is square or rectangular in cross section and which emanates from an apex coincident with central ray 25 where it intersects the focal spot of the X-ray tube in casing 12.

In order to preclude off-focal spot radiation, or radiation outside the main cone of radiation from impinging on the patient 14 or cassette 15, the swinging shutter blades 26, 27 for instance, are also provided with a pair of metal cross strips 62, 63. These strips span the U-shaped blades 26 and 27 and they may be made of steel but coated with a foil of lead in order to enhance X-ray absorption. These strips do not participate in collimating or defining the main beam of radiation. Of course, the opposite pair of swinging blades 32 and 33 are also provided with similar cross members and these are identified in FIG. 2 by the primed reference numerals 62' and 63'.

Although the description thus far has pertained primarily to a manually operated cone assembly, it will appear hereinafter that the assembly may be adapted for motor driven operation as well. For this purpose, opposite blade pairs 26, 27 and 32, 33 together with their cooperating sliding blades 55, 56 and 57, 58 may be constructed in a manner similar to the way in which they were described in connection with a manually operated cone assembly. Also featured in the motor driven cone assembly are the blade drive and centering means including pulleys 37 and 40 together with cross-over cable 41 and its attaching means.

In FIG. 2 it will be observed that the lower cross members of blades 26, 27 and 32, 33 are provided with pointed clips 64, 65 which project into the radiation beam. Each blade is provide with one clip. These may be pointed lead strips which are squeezed onto the blades. They may be removed at the choice of the user or they may be slidably adjusted to project more or less into the beam as desired. When a radiograph is taken on cassette 15, if the shutter blades are opened so that the radiation field just covers the film in the cassette 15, points 64 and 65 which are opaque to X-radiation appear at the edge of the film. If the shutter blades are adjusted so that the field is smaller than the cassette or film, the points will, of course, appear at the margin of the exposed film area. If the shutter blades are open more than required to cover the film, points 64 and 65 will not appear on the exposed area since they will cast their shadow outside the cassette. Thus, there is an indication of whether the beam dimensions are proper and whether the patient 14 has received only the necessary amount of radiation for covering the anatomical region of interest.

Attention is now directed to the means for providing a visual determination of the X-ray beam field size to which the cone assembly is adjusted. This description will be given for the manually operated cone assembly primarily in connection with FIGS. 2 and 4. First, it should be recalled that the field dimension scale related to a specific focal spot-to-film distance appears on a drum 19 which is visible through a sight opening 18 in the front of the cone assembly 10. The field dimension across the paper is indicated by a pointer 23 with respect to the markings on the drum. Pointers 22 and 23 are adapted to be moved axially along drum 19 by a cord and pulley arrangement which couples them for joint movement with their corresponding pairs of blades 32, 33 and 26, 27 respectively.

Drum 19 is journaled in a frame having upstanding side members 70 and a backplate 71. The backplate is supported on one of the depending chassis sides 31 by means of posts which are not shown in FIGS. 2 or 3 for the sake of clarity. Detent means for indexing the drum into distinct angular positions corresponding with the selected focal spot-to-film distances are omitted, but those versed in the art will readily appreciate how drum shaft 21 may be indexed in fixed angular positions by many available mechanical means. Anything that prevents rotation of the drum 19 unless there is application of a manual force to knob 20 will serve the purpose.

Figure 4:
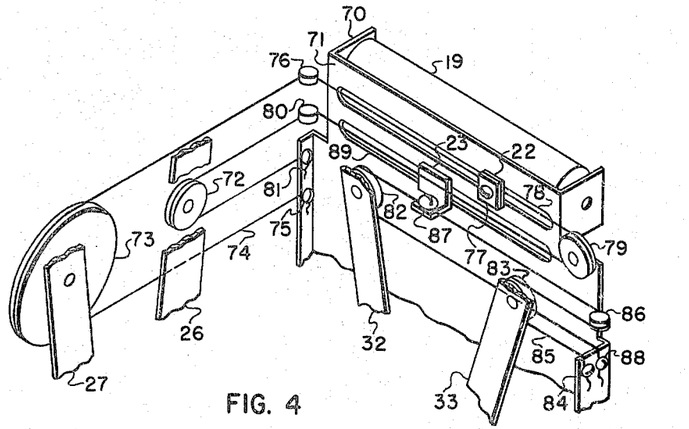
FIG. 4 shows the shutter blade position indicating means of a manually operated cone assembly, some parts being removed for clarity.

Consideration will first be given to means for actuating one field dimension indicating pointer 22 when knob 16 is turned to swing blades 26, 27 and to slide blades 57 and 58 jointly. In FIG. 4 it is seen that blade 26 carries a rotatable pulley 72 which swings with the blade and that blade 27 carries another larger pulley 73 that does likewise. The end of a cord 74 is fastened at 75 to the frame 71. Starting with fixed point 75, cord 74 runs around pulley 73 and to a fixed direction changing pulley 76 after which the cord crosses the front of the cone assembly. Pointer 22 is clamped with a small plate 77 and screw assembly to the cord 74 as shown. The pointer 22 is adapted to slide in opposite directions in a slot 78 along with opposite movements of cord 74. From the point on cord 74 where pointer 22 is clamped, the cord continues over a pulley 79 after which the cord crosses back over the front of the cone assembly and passes over a pulley 80 from whence it goes around pulley 72 on the blade 26 and terminates at a point 81 where its end is fixed. It is only the pulleys 72 and 73 on the blades which rotate on and swing with the shutter blades, all the other pulleys 76, 79, 80 just mentioned rotate on fixed shafts.

It will be seen that if pulley 73 on blade 27 is swung to the left in FIG. 4, during manual operation of the shutter blades 26, 27, that a tension will be placed on cord 74 so as to draw indicator 22 to the left. At the same time, blade 26 moves right along with pulley 72 so that a constant tension may be maintained in cord 74. The actual driving force for blade 26 is, of course, derived from the cross-over cable 41 and the driving and driven pulleys 37 and 35 described earlier. The indicator pointer 22 merely follows the movement of blades 26, 27 as result of the cord and pulley arrangements just described. The tension on cord 74 remains constant during blade movement and when the blades are at rest, the only force transmitted by cord 74 is that which is required to overcome the negligible friction of the bearings for the various pulleys and between the guide slot 78 and indicator point 22. Movement of blades, 26, 27 toward each other will cause pointer 22 to move to the right in FIG. 4.

The other pair of cross blades 32 and 33 are also provided with a pair of pulleys of the same size, 82 and 83 respectively. The cord for moving pointers 23 that indicates the other field dimension in reference to the scale on drum 19 originates at a cord clamping screw 84 after which it runs over pulley 83 on blade 33 and changes direction at a fixed but rotatable pulley 86 after which it is clamped to pointer 23 by a screw 87 from which it proceeds around pulley 82 and returns to another fixed point 88.

It will again be seen that separation of blades 32 and 33 will cause pulleys 82 and 83 to separate in which case pointer 23 will be moved to the left in its guide slot 89 as viewed in FIG. 4. Closing the shutters will, of course, move pointer 23 to the right.

Advantages of the field dimension indicating system just described are that the pointers 22 and 23 maintain the proper correlation with the shutter blade openings and that the correlation can be established very easily during assembly of the cone. It does not make any difference whether the cord is taut or comparatively loose for there is always an equal division of the tension in it on opposite sides of the point such as 87 at which the cord is clamped to the indicator pointer 23. The pointers are easy to set with respect to the field dimension scales since it is only necessary to tighten the cord clamping screw 87 or its counterpart 77 when the pointers indicate the field dimensions on drum 19.

Figure 6:
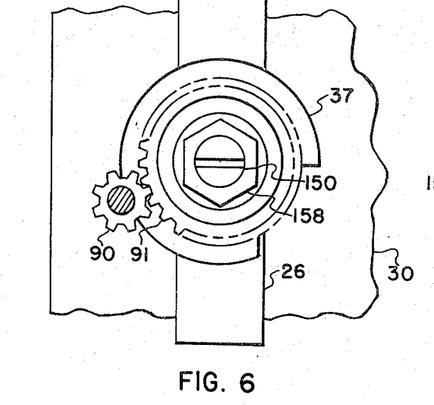
FIG. 6 is a front view of the gear and friction clutch drive for a shutter blade in the motor driven version.

The motor driven version of the cone assembly will now be described primarily in connection with FIG. 8. In this case, the chassis again includes four down-turned side members, two of which 30 and 50 are shown, but their opposite counterparts are omitted in the figure. There are again provided pairs of blades which may be pivoted on the side members 30, 50 in the same manner as in the manually operated cone assembly described above. One pair of blades 26, 27 appears in cross section as does the other pair 32, 33 in FIG. 8. On blade 26 there is fastened a pulley 37 and the same type of cross cable 41 is used to connect it with another pulley 40 affixed to coacting blade 27. What was said about the way cable 41 is fastened to the pulleys and about the means for adjusting the blades to centered position in the manually operated cone, applies here. In this case, however, instead of pulley 37 being rotated by a helical gear and sector, it is rotated or driven by a pinion 90 that engages a gear 91. The gear 91 is coupled with pulley 37 for driving the same through the agency of a slip clutch 92 which appears between the gear and a motor support bracket 93. Clutch 92 will be described in detail later in reference to FIGS. 6 and 7. When gear 91 rotates, it transfer its torque through slip clutch 92 to drive blade pulley 37 in one direction or another. The driving force is obtained from a motor 94 which acts through a speed reducer 95 to rotate pinion 90 and gear 91 when the motor 94 is commanded through a remote switch to turn in one direction or the other.

Figure 7:
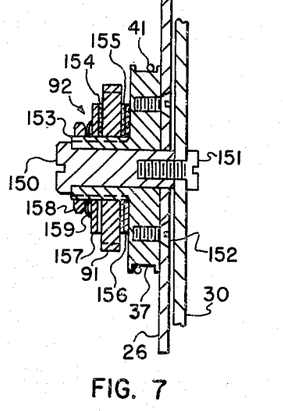
FIG. 7 is a cross section of the drive and clutch of FIG. 6 taken on a line approximately 7—7 in FIG. 8 in order to indicate its location in the cone assembly.

The construction of the friction clutch assembly 92 which transmits power between motor 94 and a shutter blade 26 will now be described. In FIG. 7 it is seen that there is provided a shaft 150 which is fixed to the chassis side member 30 by a screw 151. Cross-over cable pulley 37 is fastened to shutter blade 26 by screws 152. Pulley 37 and blade 26 are loosely journaled on fixed shaft 150. Pulley 37 has a hub extension 153 on which gear 91 is journaled. In the absence of any coupling means gear 91 is free to rotate on hub extension 153 without rotating pulley 41 on blade 26.

Gear 91 is engageable with pulley 37, however, by means of a frictional connection which includes fiber friction discs 154 and 155 that bear on opposite faces of the gear. These discs are between metal washers 156, 157. The gear 91, fiber washers 154, 155, and metal washers 156, 157 are pressed against pulley 37 by a nut 158 that threads on hub extension 153. In order to effect resilient pressure there is interposed between nut 158 and metal washer 157 a Belleville washer 159.

Thus, it is seen that when gear 91 is rotated, its torque is frictionally transferred to pulley 37 and blade 26 whereupon the latter swings. If the blade is stopped by reason of being wide open or fully closed, the gear 91 merely slips with respect to pulley 37 without stopping motor 94. Meanwhile, the relative positions of coacting shutter blades and the blade position indicators maintain their adjustment even though the motor has run without actually driving the blades.

Figure 8:
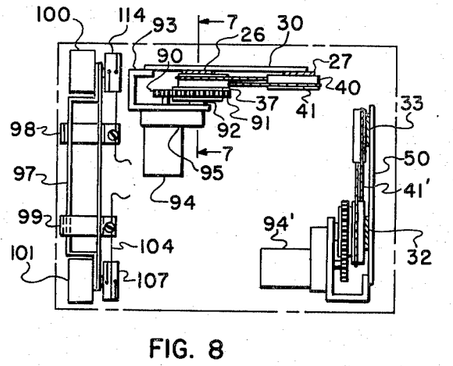
FIG. 8 is a bottom view, with parts removed, showing the motors and blade drive mechanisms for the motor driven version of the cone assembly.

As will be seen in FIG. 8, the other pair of blades 32, 33 are driven in a similar manner by a motor 94'.

As illustrated in FIG. 8, the motor driven version of the cone assembly is adapted for a fixed focal spot-to-film or cassette distance. This is evidenced by the fact that in place of drum 19, in the manually operated unit, there is provided in the motor driven version an index plate 97 on whose far left face, as it appears in this figure, there is located the field dimension scale similar to that which may be seen through sight opening 18 in FIG. 1. Of course, in applications where it is desirable, the rotating drum 19 and manual control knob 20 of the manually operated cone can be substituted for field dimension indicating index plate 97. In FIG. 8 it will be seen that there is, nevertheless, a pair of pointers 98 and 99 which indicate the field dimensions and these dimensions may be on a decal adhered to the face of plate 97. In FIG. 8, one may see that the motor driven version of the cone assembly also differs from the manual version by provision of a couple of potentiometers 100 and 101. It will be explained later how these potentiometers act in a circuit which provides a visual indication of the shutter blade positions through electric means.

Figure 5:
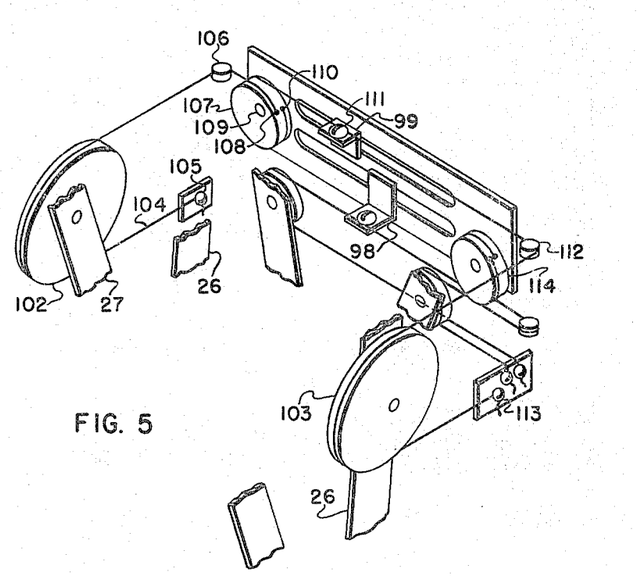
FIG. 5 shows the shutter blade position indicating means of a cone assembly that is primarily adapted for remote operation and both proximate and remote blade position indication.

The means for providing a visual indication of the shutter blade openings in the motor driven version from a station in proximity with the cone assembly, may be understood best by reference to FIG. 5. It will be observed that the pulley and cord arrangements in FIG. 5 differ from those appearing in the manual version of FIG. 4, so different reference numerals will be used for these pulleys and the cord in this case.

Focusing attention on one pair of shutter blades 26, 27 it will be seen that blade 27 carries on it a rotationally supported pulley 102 and that the side of blade 26 on the opposite side of the cone, carries a similarly mounted pulley 103. A cord 104 begins and is fastened at a screw 105. The cord runs around pulley 102 to an idler pulley 106 after which it runs to potentiometer pulley 107 and enters a hole 108. The cord terminates in a knot that resides in an axial hole 109. In practice, the end of cord 145 is passed through radial hole 108 and out of holes 109 for tying the knot, after which the cord is tensed and its end fastened at screw 105. Although the cord 104 is in a sense discontinuous at the pulley 107, it does in reality continue in the form of an extension which has another knot on its end and emerges from a radial hole 110 in pulley 107. The effect is to cause cord 104 to be given a complete wrap around pulley 107 and to continue it to a point where it may be clamped with a screw 111 on indicator pointer 99. The cord then continues around another idler pulley 112 after which it makes a return loop around pulley 103 on blade 26 and is fastened by a screw 113. Thus, it will be seen that when the blades 26 and 27 in one pair are caused to spread from each other by the motor driven mechanism, pulleys 102 and 103 translate in opposite directions and cause cord 104 to move indicator pointer 99. The other pair of blades 32, 33 are provided with a substantialy similar pulley and cord arrangement for operating the other dimension indicating pointer 98. This arrangement also operates another potentiometer shaft pulley 114.

From the description thus far, it is seen that swinging of a blade pair such as 26, 27 causes rotation of potentiometer pulley 107 through the agency of cord 104. Pulley 107 is mounted on the shaft of a potentiometer 101 as can be seen clearly in FIG. 8. The same may be said regarding potentiometer pulley 114 which is mounted on the shaft of a potentiometer 100. Thus it is seen that movement of one pair of shutter blades rotates one potentiometer and rotation of the other pair of blades turns the other potentiometer. Variations in the resistance of each potentiometer due to shutter blade movement effect voltage variations in a circuit that includes a meter at a remote location which is calibrated to indicate shutter opening or field dimension.

Figure 9:
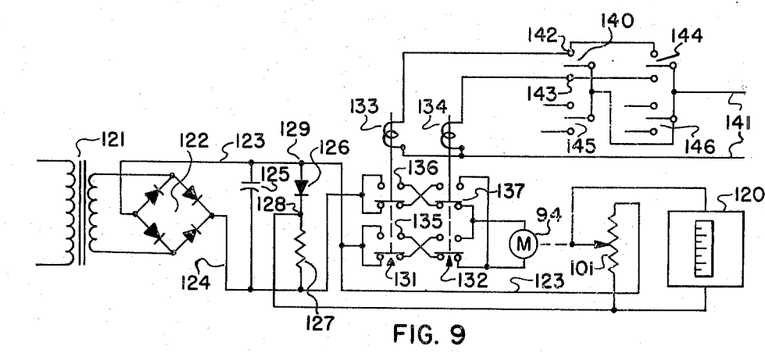
FIG. 9 is a circuit diagram illustrating how one of the motor drives is controlled and how shutter blade position is indicated remotely.

In connection with FIG. 9 there will now be described the circuitry associated with controlling one of the blade actuating motors 94 and its associated potentiometer 101 that enables the shutter blade opening to be indicated on an electric voltmeter or ammeter 120 that is calibrated in field dimensions. In FIG. 9 there is shown a step-down transformer 121 supplying a full-wave rectifier 122 that feeds a pair of D.C. output lines 123 which may be positive and 124 which may be ground or negative. A smoothing capacitor 125 is also provided. Across the D.C. lines 123 and 124 there is a series circuit including a Zener diode 126 and a resistor 127. A voltage appearing at point 128 is regulated at a very stable value and this voltage is supplied to the potentiometer winding 101 from whence it returns to the positive side of the line by way of conductor 123.

Attention is now directed to the circuit for reversibly driving motor 94. It will be observed that the unregulated D.C. power may be fed by way of unregulated D.C. lines 123 and 124 to adjacent four pole, two-position contactors 131 and 132. These contactors intervene between the supply and motor 94 so as to control the energization and direction of rotation of the motor. The contactors are shown in positions corresponding with the motor 94 being deenergized. Their positions may be changed, however, by energizing their operating coils 133 and 134 alternately. If 133 is energized, for example, it completes the circuit across to stationary contacts 135 and 136 so that a circuit is completed from line 130 across contacts 136 and then through a jumper, and then through closed contacts 137 to one side of the motor 94. The return path from motor 94 is through the closed lowermost contact of contactor 132, through a jumper and a path across contacts 135, and then back to line 123.

It is easy to see that the polarity of the voltage applied to motor 94 will be reversed as will the direction of rotation when the other relay coil 134 is energized so as to change the conductive paths through contactor 132 when its plunger is attracted upwardly. At this time, relay coil 133 would be de-energized.

Switches for selecting the direction of motor rotation either proximately or remotely from the cone assembly are also provided. One of the switches 140 is a double throw switch that permits connecting one power line 141 with a terminal 142 which causes relay contact 133 to bring about rotation of motor 94 in one direction, to close the shutter blades for instance. When the circuit to the other terminal 143 is completed in the alternative, relay coil 134 is energized and it causes motor 94 to operate in the reverse direction. There may also be provided a similar double throw switch 144 which may be located on a remote control console, not shown, as compared with switch 140 which may be carried on the cone assembly housing 10 in a position near or in place of the control knob 16, for example. It will be observed that the control circuitry is such that the first of the switches 140 or 144 to be closed in any position will take priority and prevent a short circuit from coming about in contactors 131 or 132. In other words, if the contact arm of switch 140 were swung clockwise for one motor rotational command, and the other switch 144 were swung counterclockwise for the opposite command, relay coil 133 would first be energized and complete the circuit for one direction of rotation. If at the same time relay 134 were energized, it would merely stop rotation of motor 94. Switches 140 and 144 are preferably of the self-centering type; that is, they return to a neutral position or open circuited position unless restrained closed by a manual force.

As symbolized in FIG. 9, rotation of motor 94 changes the setting of potentiometer 101. It can be seen in FIG. 5, that this is actually brought about more indirectly by the movement of the motor driven shutter blades 26 and 27 causing rotation of potentiometer pulley 107 through the agency of the cord 104.

The regulated D.C. voltage between the points 128 and 129 in FIG. 9 is applied across the potentiometer resistor 101. As the potentiometer arm moves with the shutter blades, voltage variations are registered on the scale of a voltmeter 120, for instance. The scale may be calibrated in terms of a field dimension for a fixed focal spot-to-film distance.

It will be seen in FIG. 9 that the circuit also includes a switch 145 that may be mounted on the cone assembly housing 10 and another switch 146 which may be on a remote control console for operating the other pair of shutter blades. This circuit would have a separate X-ray field dimension indicating meter such as 120 and the circuitry associated with switches 145, 146 and the other meter would be essentially a duplication of that which is shown and described in FIG. 9.

Earlier, a brief reference was made to the filter assembly 11 which is interposed between the top of the cone assembly housing 10 and the X-ray tube casing 12. This assembly permits the roentgenologist to interpose various amounts of filtration in the X-ray beam or to eliminate all but the inherent filtration of the X-ray tube and air path to the cassette. Because the filter assembly is not claimed in this application it will not be described in detail.

In summary, there has been described a new X-ray cone assembly that features use of a field dimension indicating drum on which is also indicated the focal spot-to-film distance at which a radiograph is to be taken. Since these indications are the only ones appearing through a sight opening, the danger of mistakenly selecting the field dimensions that do not correspond with the focal spot-to-film distance is eliminated.

To use the manual version of the cone one adjusts the position of X-ray tube casing 12 in FIG. 1 to the desired distance from film cassette 15. The focal spot-to-film distance will then appear on a scale 148 in the tube casing. If a distance of 40 inches is desired, for example, drum knob 20 is rotated until drum 19 presents a dimension scale through sight opening 18 which has the 40 inch distance indicia on it as shown. Manual shutter blade control knobs 16, 17 are then turned until their associated indicator pointers line up with numbers on the field dimension scale that corresponds with the field size required for the cassette size being used. A radiograph may then be taken.

To use the motor driven version, switches 140, 145 on the cone assembly may be used to energize the motors which drive the pairs of shutter blades. If remote operation is desired, switches 144 and 146 may be used to operate the blades. In the first instance, the field dimensions may be read on a scale fixed on scale plate 97, FIG. 8. In the second instance, the field dimensions may be read on a meter like 120 which may be on a remote console.

There has also been described a unique arrangement for connecting pairs of shutter blades to operate jointly and to permit their being centered conveniently. This involved connecting a pulley on one blade in a pair with a pulley on the other blade by means of a crossed-over cable which permits one blade to be slipped with respect to the other during adjustment, after which the cable is clamped on the one pulley so the blades maintain the same angular relationship.

Although preferred embodiments of the invention have been described it should be understood that such description is intended to be illustrative rather than limiting, for those versed in the art will now perceive that the invention may be variously embodied. Accordingly, the scope of the invention should be determined by interpretation of the claims which follow:

It is claimed:

1. An X-ray cone assembly comprising a housing having openings at opposite ends for passing an X-ray beam therethrough, mechanism support means within the housing, pairs of shutter blades whose each blade in a pair is mounted on the support means for movement through an angle opposed to the other shutter blade for defining cross-sectional dimensions of the X-ray beam, first and second pulley means attached respectively to each blade in each pair for rotation therewith, cable means coupling said first and second pulley means to each other for joint rotational movement of each blade in each pair, means for driving said blades in a pair through an angle, a field dimension indicating device including a field dimension scale means, said scale means for each dimension of the field comprising a single rotatably mounted drum means having its axis parallel with a sight opening in the housing for permitting visualization of the drum from the outside of the housing, said drum means having field dimension scales spaced apart and in parallelism with each other on the periphery of the drum, each of said scales having adjacent to it a focal spot distance indicia directly on the drum, an indicator pointer means for each pair of coacting blades that is translatable along the scale in accordance with shutter blade movement, means coupling an indicator pointer means for one field dimension with corresponding shutter blades, said last named coupling means comprising pulleys carried by the shutter blades, stationary pulleys, a cord that is attached at its ends and runs around said pulleys, said indicator pointer means being attached to the cord in a region between pulleys that is at least coextentive with the length of the dimension scales.

2. An X-ray cone assembly comprising a housing having openings at opposite ends for passing an X-ray beam therethrough, mechanism support means within the housing, pairs of shutter blades whose each blade in a pair is mounted on a support means for movement through an angle opposed to the other shutter blade for defining a cross-sectional dimension of the X-ray beam, means coupling one blade to another and a means for driving the blades in a pair through an angle, a pulley carried by and journaled for rotation on each of the shutter blades, respectively, stationary pulleys, a cord that is attached at its ends and runs around said pulleys, a potentiometer having an operating shaft means that is engaged by the cord for rotation when the cord is moved to thereby change the electric resistance value across the potentiometer in accordance with the position of a shutter blade pair, remotely located electrical meter means in circuit with said potentiometer and responsive to resistance values thereof, said meter being calibrated in terms of a corresponding field dimension, and an electric power supply in circuit with the potentiometer and meter means.

3. An X-ray cone assembly comprising a housing having openings at opposite ends for passing an X-ray beam therethrough, mechanism support means within the housing, pairs of shutter blades whose each blade in a pair is mounted on the support means for movement through an angle opposed to the other shutter blade for defining a cross sectional dimension of the X-ray beam, means coupling one blade to another and means for driving said blades in a pair through an angle, a field dimension remote indicating device including pulleys carried by the shutter blades and stationary pulleys, a cord fixed at both ends and running around said pulleys, a potentiometer mounted in said housing and having a shaft with a pulley thereon which is engaged by the cord and rotatable thereby in correspondence with movements of a shutter blade, an electric power supply and a meter in circuit with said potentiometer, said meter being responsive to the setting of the potentiometer and adapted to convert the setting to a corresponding field dimension.

4. An X-ray cone assembly comprising a housing having openings at opposite ends for passing an X-ray beam therethrough, pairs of shutter blade means movable at right angles to each other in the housing to define the dimensions of the emergent beam, first and second pulley means attached respectively to each shutter blade means in each pair for rotation therewith, cable means coupling said first and second pulley means to each other for joint rotational movement of each shutter blade means in each pair, so that driving of one shutter blade means in a pair will cause said other shutter blade means in that pair to swing in an opposite direction, said housing having a sight opening, a rotatable drum means located for viewing substantially its whole length and only a part of its periphery through the sight opening, a plurality of X-ray field dimension scales spaced in parallelism with each other circumferentially about the drum, a different focal spot distance indicia on the drum adjacent each of the respectively different scales, indicator pointer means movable along the scales in accordance with the relative position of the shutter blades, means coupling said indicator means for movement with the blades, and means for rotating said drum means to present different scales and one associated focal spot distance indicia sensibly to the sight opening.

5. An X-ray cone assembly comprising:
  (a) a housing that may be compled with an X-ray source for passing an X-ray beam therethrough,
  (b) two pairs of X-ray shutter blade means which are adapted to swing crosswise of each other transversely of the beam path for defining the desired cross-sectional configuration of the beam at a predetermined distance from an X-ray source.
  (c) a mechanism support means within the housing,
  (d) each blade means of a pair being mounted on the mechanism support means on a pivot axis for swinging oppositely with respect to each other when actuated,
  (e) a gear sector attached respectively to one blade in each pair for rotation therewith about the pivot axis,
  (f) first and second pulley means attached respectively to each blade in each pair for rotation therewith about the pivot axis.
  (g) a cable means that has both of its ends attached to the first pulley means and that crosses over on itself and passes around the second pulley in frictional engagement,
  (h) a clamping means on the second pulley, said clamping means being adapted to permit relative rotation between the pulley and cable when released and to prohibit relative rotation when clamped, whereby to permit adjustment of one shutter blade in a pair independently of the other in reference to the center of the X-ray beam path.
  (i) manually turnable shafts for setting the respective field dimensions,
  (j) each of said shafts having a helical gear affixed coaxially therewith and each helical gear being meshed with a gear sector on one blade in a pair whereby to drive the blade pairs to new field dimensions when the shafts are turned.

References Cited by the Examiner

UNITED STATES PATENTS

| | | | |
|---|---|---|---|
| 2,806,146 | 9/57 | Thompson | 250—105 |
| 2,835,135 | 5/58 | Quick | 74—222 |
| 2,894,144 | 7/59 | Barrett | 250—105 |
| 2,921,202 | 1/60 | Berger | 250—105 |
| 3,023,314 | 2/62 | Hura | 250—105 |

RALPH G. NILSON, *Primary Examiner.*

UNITED STATES PATENT OFFICE
CERTIFICATE OF CORRECTION

Patent No. 3,206,604                                  September 14, 1965

Lloyd S. Burchell

It is hereby certified that error appears in the above numbered patent requiring correction and that the said Letters Patent should read as corrected below.

Column 12, line 45, for "compled" read -- coupled --; same column 12, lines 51, 61 and 72, strike out the period, each occurrence, and insert instead a comma.

Signed and sealed this 12th day of April 1966.

(SEAL)
Attest:

ERNEST W. SWIDER                                    EDWARD J. BRENNER
Attesting Officer                                         Commissioner of Patents